United States Patent
Lunsford et al.

(10) Patent No.: US 10,431,145 B2
(45) Date of Patent: Oct. 1, 2019

(54) TRANSPARENT WHITEBOARD DISPLAY

(71) Applicant: Hewlett-Packard Development Company, L.P., Houston, TX (US)

(72) Inventors: Eric Michael Lunsford, Sunnyvale, CA (US); Donald Gonzalez, Redwood City, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/326,272

(22) PCT Filed: Jul. 30, 2014

(86) PCT No.: PCT/US2014/048780
§ 371 (c)(1),
(2) Date: Jan. 13, 2017

(87) PCT Pub. No.: WO2016/018274
PCT Pub. Date: Feb. 4, 2016

(65) Prior Publication Data
US 2017/0206828 A1 Jul. 20, 2017

(51) Int. Cl.
*G06F 3/042* (2006.01)
*G06F 3/041* (2006.01)
(Continued)

(52) U.S. Cl.
CPC .............. *G09G 3/2096* (2013.01); *B43L 1/12* (2013.01); *G06F 3/017* (2013.01); *G06F 3/0304* (2013.01);
(Continued)

(58) Field of Classification Search
CPC ........ G09G 3/2096; G09G 3/32; G06F 3/017; G06F 3/0304; G06F 3/041; B43L 1/12
See application file for complete search history.

(56) References Cited

U.S. PATENT DOCUMENTS 4,714,983 A * 12/1987 Lang ..................... G02B 6/0021
349/65
4,928,301 A * 5/1990 Smoot .................... H04N 7/144
348/14.16

(Continued)

FOREIGN PATENT DOCUMENTS

CN 201698393 1/2011
KR 10-20060040347 A 5/2006

(Continued)

OTHER PUBLICATIONS

Hiroshi Ishii and Minoru Kobayashi, ClearBoard: A Seamless Medium for Shared Drawing and Conversation with Eye Contact, May 3-7, 1992, Association for Computing Machinery (ACM), pp. 525-532.*

(Continued)

*Primary Examiner* — Mihir K Rayan
(74) *Attorney, Agent, or Firm* — Brooks Cameron & Huebsch PLLC (57) ABSTRACT

Examples of a transparent whiteboard display are disclosed. In one example implementation according to aspects of the present disclosure, a transparent whiteboard display causes digital content to be viewable on the transparent whiteboard display when the transparent whiteboard display is in a display mode. The transparent whiteboard display also causes analog content to be viewable on the transparent whiteboard display when the transparent whiteboard display in a transparent mode.

14 Claims, 5 Drawing Sheets

(51) Int. Cl.
*G09G 3/20* (2006.01)
*G06F 3/147* (2006.01)
*B43L 1/12* (2006.01)
*G06F 3/01* (2006.01)
*G06F 3/03* (2006.01)
*G09G 3/32* (2016.01)

(52) U.S. Cl.
CPC .............. *G06F 3/042* (2013.01); *G06F 3/147* (2013.01); *G06F 3/041* (2013.01); *G09G 3/32* (2013.01)

(56) References Cited

U.S. PATENT DOCUMENTS

| | | | |
|---|---|---|---|
| 4,989,956 A * | 2/1991 | Wu | B60Q 1/44 349/122 |
| 5,025,314 A | 6/1991 | Tang et al. | |
| 5,063,600 A | 11/1991 | Norwood | |
| 5,159,445 A * | 10/1992 | Gitlin | H04N 7/144 348/14.01 |
| 5,243,413 A * | 9/1993 | Gitlin | H04N 7/144 348/14.15 |
| 5,638,501 A * | 6/1997 | Gough | G06F 3/0481 345/639 |
| 5,745,711 A | 4/1998 | Kitahara et al. | |
| 6,243,068 B1 * | 6/2001 | Evanicky | G02B 6/0068 345/102 |
| 7,224,347 B2 | 5/2007 | Martin et al. | |
| 8,622,750 B2 | 1/2014 | Balint et al. | |
| 9,800,931 B1 * | 10/2017 | Tangeland | H04N 21/4438 |
| 2001/0024720 A1 * | 9/2001 | Sweet | B41M 5/52 428/343 |
| 2005/0077425 A1 * | 4/2005 | Payette | B64G 1/409 244/62 |
| 2005/0077452 A1 * | 4/2005 | Morrison | G06F 3/0428 250/221 |
| 2006/0187142 A1 * | 8/2006 | Lesniak | G06F 3/1431 345/1.1 |
| 2007/0165007 A1 * | 7/2007 | Morrison | G06F 3/03545 345/175 |
| 2010/0265214 A1 | 10/2010 | Green et al. | |
| 2011/0019056 A1 * | 1/2011 | Hirsch | G06F 3/0325 348/333.01 |
| 2011/0164047 A1 * | 7/2011 | Pance | G06F 1/1647 345/581 |
| 2011/0234746 A1 | 9/2011 | Saleh et al. | |
| 2012/0032891 A1 * | 2/2012 | Parivar | G06F 3/04883 345/173 |
| 2012/0105370 A1 | 5/2012 | Moore | |
| 2013/0088464 A1 | 4/2013 | Pearce | |
| 2013/0147711 A1 | 6/2013 | Njolstad et al. | |
| 2013/0321686 A1 * | 12/2013 | Tan | H04N 5/222 348/333.01 |
| 2014/0118306 A1 * | 5/2014 | Moses | G06F 3/042 345/176 |
| 2014/0317561 A1 * | 10/2014 | Robinson | H04N 7/15 715/800 |
| 2017/0301288 A1 * | 10/2017 | Perdices-Gonzalez | G09G 3/3225 |

FOREIGN PATENT DOCUMENTS

| | | |
|---|---|---|
| KR | 10-2012107697 A | 10/2012 |
| KR | 10-20140020443 A | 2/2014 |

OTHER PUBLICATIONS

Rutgers School of Arts and Sciences; "Using the touchscreen in Core 305"; https://www.cs.rutgers.edu/resources/rooms_and_equipment/C305/index.whtml; 4 pages.

Switchable Projection Window, (Research Paper), Dec. 31, 2012. <http://www.scienstry.us/Introducing%20Switchable%20Projection%20Window.pdf>.

* cited by examiner

TRANSPARENT WHITEBOARD DISPLAY

CROSS-REFERENCE TO RELATED APPLICATION

This application is a U.S. National Stage Application of and claims priority to International Patent Application No. PCT/US2014/048780, filed on Jul. 30, 2014, and entitled "TRANSPARENT WHITEBOARD DISPLAY," which is hereby incorporated by reference in its entirety.

BACKGROUND

During meetings, conferences, and other gatherings, presenters may desire to display electronic content such as images, text, video, and other information on a display to be seen by participants. For example, a presenter may display a presentation. Similarly, a remote video feed may be displayed to show other participants such as in a remote location. Presenters may also desire to present analog content by writing and/or drawing on a whiteboard surface. For example, a presenter may wish to write down notes concerning a displayed presentation.

BRIEF DESCRIPTION OF THE DRAWINGS

The following detailed description references the drawings, in which.

DETAILED DESCRIPTION

Traditionally, some conference rooms, meeting rooms, or classrooms implement displays and whiteboards separately such that the display for displaying content and the whiteboard for providing a writing surface occupy separate surfaces. This approach consumes more real estate and presents problems for remote participants since the remote participants typically have no convenient way to see content written/drawn on the whiteboard during the meeting. This can also be an issue for capturing the content written/drawn on the whiteboard for historic recording and archiving purposes. Current solutions may include using a camera to capture the analog content on the whiteboard.

Other meeting rooms attempt to solve this problem by using displays that can function as both a display for displaying electronic content and as a virtual electronic whiteboard. In such an implementation, the display utilizes virtual electronic whiteboard functionality to enable a presenter to "draw" on the whiteboard. Such drawing is performed using special electronic styli and/or finger touches on the whiteboard. The display captures the input and displays it digitally on the display, thereby creating a virtual electronic "whiteboard." However, traditional whiteboard pens/markers are not useful in "drawing" on the virtual electronic whiteboard. Moreover, the dual functionality of the displays that also function as a virtual electronic whiteboard causes the display and whiteboard each to be of a lesser quality and usability than they would be individually.

Various implementations are described below by referring to several examples of a transparent whiteboard display and systems and methods relating thereto. In one example implementation according to aspects of the present disclosure, a transparent whiteboard display causes digital content to be viewable on the transparent whiteboard display when the transparent whiteboard display is in a display mode. The transparent whiteboard display also causes analog content to be viewable on the transparent whiteboard display when the transparent whiteboard display in a transparent mode.

In some implementations, the transparent whiteboard display enables a display to function as both a display and whiteboard. The transparent whiteboard display can implement whiteboard functionality and display functionality concurrently in different regions of the transparent whiteboard display. Moreover, the transparent whiteboard display provides convenient mechanisms for capturing the content written/drawn on the transparent whiteboard display to be displayed to remote participants or to be archived for historic purposes. Additionally, the transparent whiteboard display can still function as a whiteboard even when the display is not powered or is otherwise inactive. These and other advantages will be apparent from the description that follows.

Figure 1:
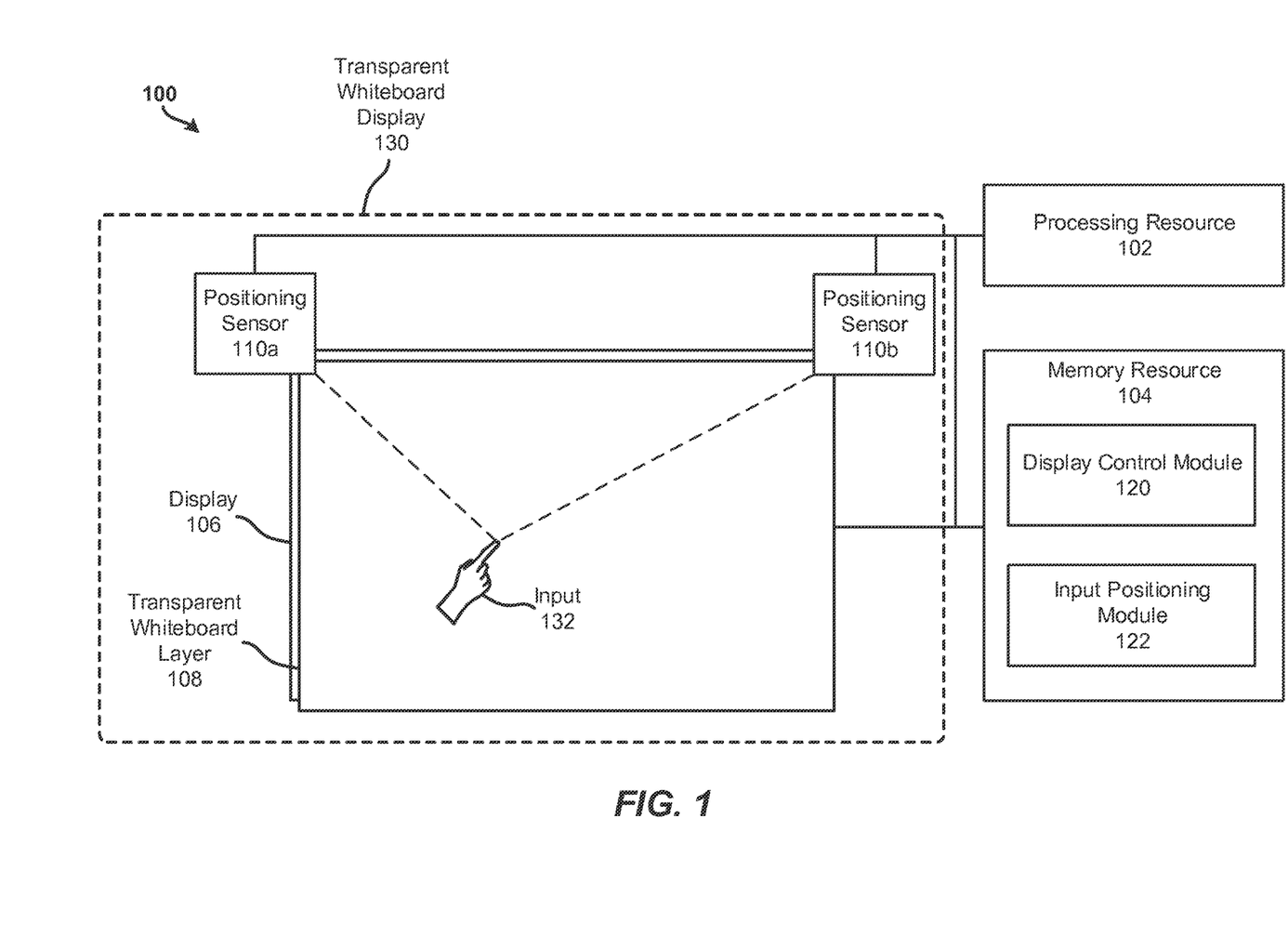
FIG. 1 illustrates a computing system having a transparent whiteboard display according to examples of the present disclosure.
Figure 2:
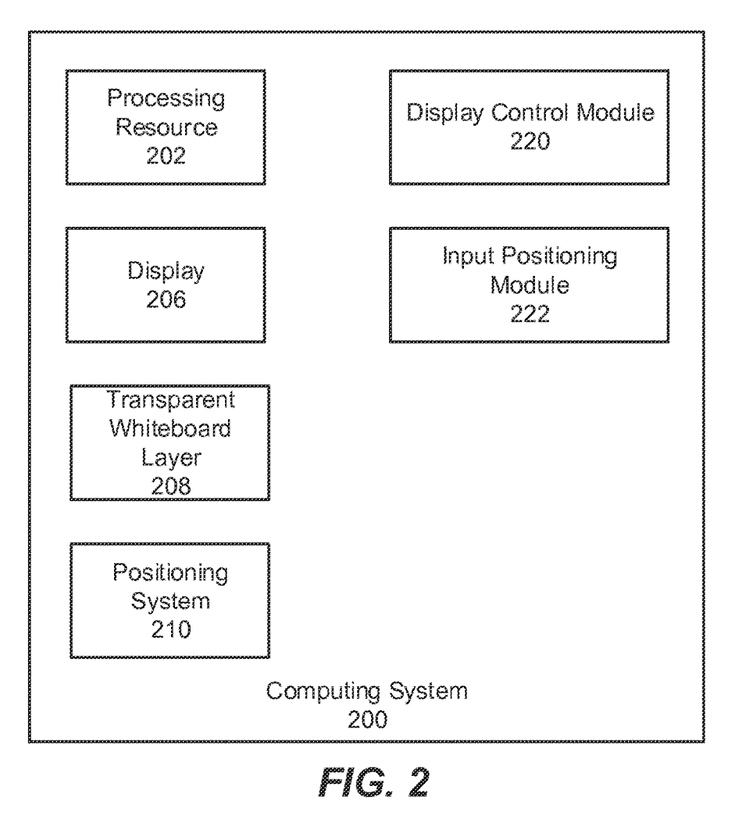
FIG. 2 illustrates a computing system having a transparent whiteboard display according to examples of the present disclosure.

FIGS. 1 and 2 include particular components, modules, etc. according to various examples as described herein. In different implementations, more, fewer, and/or other components, modules, arrangements of components/modules, etc. may be used according to the teachings described herein. In addition, various components, modules, etc. described herein may be implemented as one or more software modules, hardware modules, special-purpose hardware (e.g., application specific hardware, application specific integrated circuits (ASICs), embedded controllers, hardwired circuitry, etc.), or some combination of these.

Generally, FIGS. 1 and 2 relate to components and modules of a computing system, such as computing system 100 of FIG. 1 and computing system 200 of FIG. 2. It should be understood that the computing systems 100 and 200 may include any appropriate type of computing system and/or computing device, including for example smartphones, tablets, desktops, laptops, workstations, servers, smart monitors, smart televisions, digital signage, scientific instruments, retail point of sale devices, video walls, imaging devices, peripherals, networking equipment, or the like.

FIG. 1 illustrates a computing system 100 having a transparent whiteboard display 130 according to examples of the present disclosure. The computing system 100 may include a processing resource 102 that represents generally any suitable type or form of processing unit or units capable of processing data such as by fetching, interpreting, and executing instructions. The processing resource 102 may be one or more central processing units (CPUs), microprocessors, and/or other hardware devices suitable for retrieval and execution of machine or computer-readable instructions.

The machine or computer-readable instructions may be stored, for example, on a non-transitory tangible computer-readable storage medium, such as memory resource 104, which may include any electronic, magnetic, optical, or other physical storage device that store executable instructions. Thus, the memory resource 104 may be, for example, random access memory (RAM), electrically-erasable programmable read-only memory (EPPROM), a storage drive, an optical disk, and any other suitable type of volatile or non-volatile memory that stores instructions to cause a programmable processor (e.g., processing resource 102) to perform the techniques described herein. In examples, memory resource 104 includes a main memory, such as a RAM in which the instructions may be stored during runtime, and a secondary memory, such as a nonvolatile memory in which a copy of the instructions is stored.

Alternatively or additionally, the computing system 100 may include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein. In some implementations, multiple processing resources (or processing resources utilizing multiple processing cores) may be used, as appropriate, along with multiple memory resources and/or types of memory resources.

In addition, the computing system 100 may include a transparent whiteboard display 130, which includes a display 106 and a transparent whiteboard layer 108. The display 106 represents generally any combination of hardware and programming configured to exhibit or present a message, image, view, or other presentation for perception by a user of the computing system 100. In examples, the display 106 may be or include a monitor, a touchscreen, a projection device, and/or a touch/sensory display device. The display 106 may display text, images, and other appropriate graphic content. In examples, the display may be any of a variety of suitable display types, including cathode ray tube (CRT) displays, light-emitting diode (LED) displays, organic LED displays, plasma displays, and liquid crystal displays (LCD), among others. In examples, the display 106 may be configured to receive touch inputs on a display surface of the display 106 such that the display 106 is a touch-sensitive display.

In examples, the display 106 may have two operational modes: a display mode and a transparent mode. During the display mode, the display 106 may display electronic content. During the transparent mode, the display 106 may be made transparent such that a viewer sees through the display 106 to whatever is behind the display 106. In the transparent mode, the display 106 may be made wholly or partially transparent such that the entire display 106 is made transparent (wholly transparent) or a portion of the display 106 is made transparent (partially transparent) while another portion of the display 106 is in display mode. In this case, a portion of the display may be transparent while another portion of the display displays electronic content. The two operational modes may be controlled, for example, by the display control module 120, discussed in more detail below.

The transparent whiteboard 108 may be, for example, a surface attached to (or positioned adjacent to) the display 106 such that the transparent whiteboard 108 covers the displaying portion (i.e., the portion of the display used to display electronic content viewable by a user of the display) of the display 106. In particular, the transparent whiteboard 108 may be a glass, plastic, or other suitable surface attached to the display 106, the glass, plastic, or other suitable surface having a whiteboard substance applied thereto. The whiteboard substances enables the glass, plastic, or other suitable surface to receive an ink substance such as from a pen, marker, or other writing implement. In other examples, the transparent whiteboard 108 may be a transparent whiteboard substance or material applied directly to the display 106. The transparent whiteboard 108 is transparent in the sense that, regardless of the material used, the display 106 and any content displayed thereon is visible through the transparent whiteboard 108. The transparent whiteboard 108 is a whiteboard in the sense that it is capable of receiving an ink substance such as from a pen, marker, or other writing implement suitable for use on a whiteboard.

The transparent whiteboard display 130 also includes a positioning system. The positioning system includes physical hardware capable of capturing data relating to a position of an input 132 such as positioning sensors 110a and 110b. The positioning sensors 110a and 110b may provide positioning data relating to the position of the input 132 to an input positioning module 122, discussed below. It should be appreciated that any suitable number of positioning sensors may be utilized. The positioning sensors 110a and 110b may be cameras, lasers, or other suitable sensors for determining a position of an object such an input 132. It should be understood that the input 132, while shown as a hand, can be any suitable type of input, including a dry erase marker, wet erase marker, or other suitable writing implement to provide an analog input, such as via ink, to the transparent whiteboard layer 108. The input 132 is shown as a hand merely to illustrate that a user may provide the input 132 to the transparent whiteboard display 130 on the transparent whiteboard layer 108.

In addition to the hardware components described, the computing system 100 may include a display control module 120 and an input positioning module 122. In one example, the modules described herein may be a combination of hardware and programming. The programming may be processor executable instructions stored on a computer-readable storage medium or tangible memory resource such as the memory resource 104, and the hardware may include the processing resource 102 for executing those instructions. Thus memory resource 104 can be said to store program instructions that when executed by the processing resource 102 implement the modules described herein. Other modules may also be utilized as will be discussed further below in other examples.

The display control module 120 controls display 106 of the transparent whiteboard display 130. More particularly, the display control module 120 controls the transparency of the display 106 by causing parts or all of the display 106 to display content or to become transparent. The display control module 120 is discussed in greater detail below regarding FIG. 2.

The input positioning module 122 determines a position of the input 132 using positioning sensors 110a and 110b. The positioning sensors 110a and 110b provide positioning data relating to the position of the input 132 to an input positioning module 122, discussed below regarding FIG. 1.

FIG. 2 illustrates a computing system having a transparent whiteboard display according to examples of the present disclosure. Like the example of the computing system 100 of FIG. 1, the computing system 200 of FIG. 2 may include a processing resource 202, a display 206, a transparent whiteboard layer 208, and a positioning system 210, which may include at least one sensor for tracking an input on the transparent whiteboard layer 208. The display control module 220 and the input positioning module 222 may be stored as computer executable instructions in a memory resource such as a computer-readable storage medium. However, in other examples, the functionality of the display control module 220 and/or the input positioning module 222 may be implemented as one or more software modules, hardware modules, special-purpose hardware (e.g., application specific hardware, application specific integrated circuits (ASICs), embedded controllers, hardwired circuitry, etc.), or some combination of these. As will be apparent, in describing FIG. 2, reference is made to components of FIG. 1.

The display control module 220 controls display 206 of a transparent whiteboard display such as transparent whiteboard display 130 of FIG. 1. More particularly, the display control module 220 controls the transparency of the display 206 by causing parts or all of the display 206 to display content or to become transparent. For example, as discussed above, the display 206 may have two operational modes: a display mode and a transparent mode. During the display mode, the display control module 220 causes the display 206 to display electronic content. During the transparent mode, the display control module 220 causes the display 206 to become transparent such that a viewer sees through the display 206 to whatever is behind the display. In the transparent mode, the display 206 may be made wholly or partially transparent such that the entire display is made transparent (wholly transparent) or a portion of the display is made transparent (partially transparent) while another portion of the display 206 is in display mode. In this case, a portion of the display 206 may be transparent while another portion of the display 206 displays electronic content.

In an example, it may be desirable to display electronic content on a first region (display region) of the display 206 while a second region (transparent region) of the display 206 is made to be transparent such that a user sees whatever is behind the second region. In one example, a white background or other monochromatic background surface may be placed behind the display 206. In this example, any written/drawn input such as input 132 of FIG. 1 on the transparent whiteboard layer 208 in the second region is easily visible against the background and is unobstructed by the display 206. Concurrently, the first region may display the desired electronic content. In this example, the transparent whiteboard display (e.g., transparent whiteboard display 130 of FIG. 1) functions as both a display and a whiteboard simultaneously.

In an example, the display control module 220 may alter the size of the transparent region such as by causing the transparent region to increase or decrease in size or move to another location on the display 206 based on the analog input provided by the user as detected by the input positioning module 222. For example, if the display 206 is made up entirely of the display region (such as by showing a video conferencing application), and a user begins providing an analog input on the transparent whiteboard layer 208 using, for example, a dry erase marker, the display control module, working with the input positioning module 222, may change the display region of the white board by inserting a transparent region where the analog input is located. As the analog input takes up additional space on the transparent whiteboard layer 208, the transparent region may increase in size. Conversely, if a user erases the content generated by the analog input, the transparent region may decrease in size, or vanish all together. In this way, remote participants in the teleconference may see the analog input.

In other examples, the display 206 may be made wholly transparent by the display control module 220 such that the entire transparent whiteboard display 130 functions as a whiteboard. In yet other examples, the display 206 may wholly display content such that the whiteboard functions are not active (although an analog input 132 would still be receivable on the transparent whiteboard layer 208).

The first and second regions (display region and whiteboard region respectively) may be customizable by a user, by the content displayed, by the input on the transparent whiteboard layer 208, or any suitable combination thereof, For example, as content moves with respect to the display 206, the display region and whiteboard region may also move. Similarly, the input positioning module 222, in conjunction with positioning system 210 (which may include positioning sensors such as positioning sensors 110a and 110b of FIG. 1), may cause the display control module 220 to display content in a display region while causing a transparent whiteboard region to appear based on the position of the input 132.

More specifically, the input positioning module 222 determines a position of the input 132 using positioning system 210 with sensors 110a and 110b, for example, As discussed above, the positioning sensors 110a and 110b provide positioning data relating to the position of the input 132 to an input positioning module 222, discussed below. It should be appreciated that any suitable number of positioning sensors may be utilized. The positioning sensors 110a and 110b may be cameras, lasers, or other suitable sensors for determining a position of an object such an input 132. In an example, the positioning sensors 110a and 110b may detect an analog input prior to becoming in contact with the transparent whiteboard layer 208. For example, a velocity vector may be calculated by the input positioning module to determine the velocity at which the input is applied to the surface of the transparent whiteboard layer 208 so as to detect "pressure" events (Le., the amount of pressure applied through the analog input).

In an example, the positioning sensors 110a and 110b are cameras that track, in real time, the position of the input 132. Data relating to the position of the input 132 is supplied by the positioning sensors 110a and 110b to the input positioning module 222. The input positioning module 222 uses the data relating to the position of the input 132 to calculate a position of the input 132. As the input 132 moves across the transparent whiteboard display 130, the positioning sensors 110a and 110b continue to track and capture the position of the input 132, and the input positioning module 222 continues to calculate the position of the input 132. In examples, the input positioning module 222 may also calculate a direction, velocity, and/or acceleration of any movement of the input 132 such that the movement can be tracked and recreated digitally. This may be desirable if recording the content created by the input 132 for archival purposes or for causing the content created by the input 132 to be displayed remotely, such as by sending the positioning information calculated by the input positioning module 222 to another computing system or device. In this way, a remote display device may recreate the analog input 132 generated by a user of the transparent whiteboard display 130 digitally on the remote display device.

Figure 3:
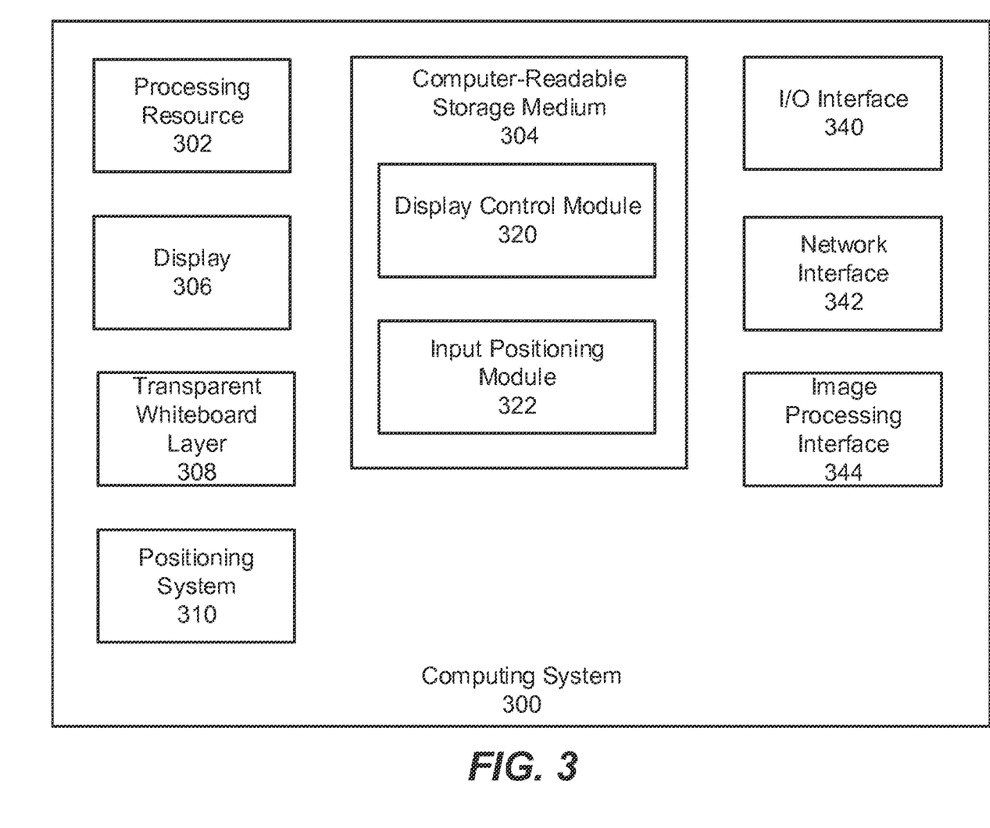
FIG. 3 illustrates a computing system having a transparent whiteboard display according to examples of the present disclosure.

FIG. 3 illustrates a computing system having a transparent whiteboard display according to examples of the present disclosure. Like the example of the computing system 200 of FIG. 2, the computing system 300 of FIG. 3 may include a processing resource 302, a display 306, a transparent whiteboard layer 308, and a positioning system 310. The display control module 320 and the input positioning module 322 may be stored as computer executable instructions in a memory resource such as computer-readable storage medium 304. However, in other examples, the functionality of the display control module 320 and/or the input positioning module 322 may be implemented as one or more software modules, hardware modules, special-purpose hardware (e.g., application specific hardware, application specific integrated circuits (ASICs), embedded controllers, hardwired circuitry, etc.), or some combination of these.

The computing system 300 also includes an input/output (I/O) interface 340, a network interface 342, and an image processing interface 344. The I/O interface 340 enables the computing system 300 to communicatively couple to other devices, such as other computing systems, peripheral devices such as microphones, cameras, sensors, and other suitable input and/or output devices using any of a variety of appropriate communications protocols, such as USB, Thunderbolt, Firewire, PCIe, etc.

The computing system 300 also includes a network interface 342 to enable the computing system 300 to communicate with other computing systems via a network connection, which may be any number and variety of wired and/or wireless connections. The network represents generally hardware components and computers interconnected by communications channels that allow sharing of resources and information. The network may include one or more of a cable, wireless, fiber optic, or remote connection via a telecommunication link, an infrared link, a radio frequency link, or any other connectors or systems that provide electronic communication. The network may include, at least in part, an Intranet, the Internet, or a combination of both. In another example, the network may be a software defined network and/or a virtualized network.

The computing system 300 also includes an image processing interface 344 to enable the computing system 300 to receive images, cause the images to be displayed on the display 306 of the transparent whiteboard display, and to output content such as the content displayed on display 306 as well as the content captured by the positioning system 310 and input positioning module 322 to other display devices (not shown). For example, the image processing interface 344 may include a variety of output interfaces such as HDMI, VGA, DVI, Display Port, component, RCA, and other suitable output interfaces to enable additional display devices to receive image content to be displayed from the computing system 300.

Figures 4A, 4B:
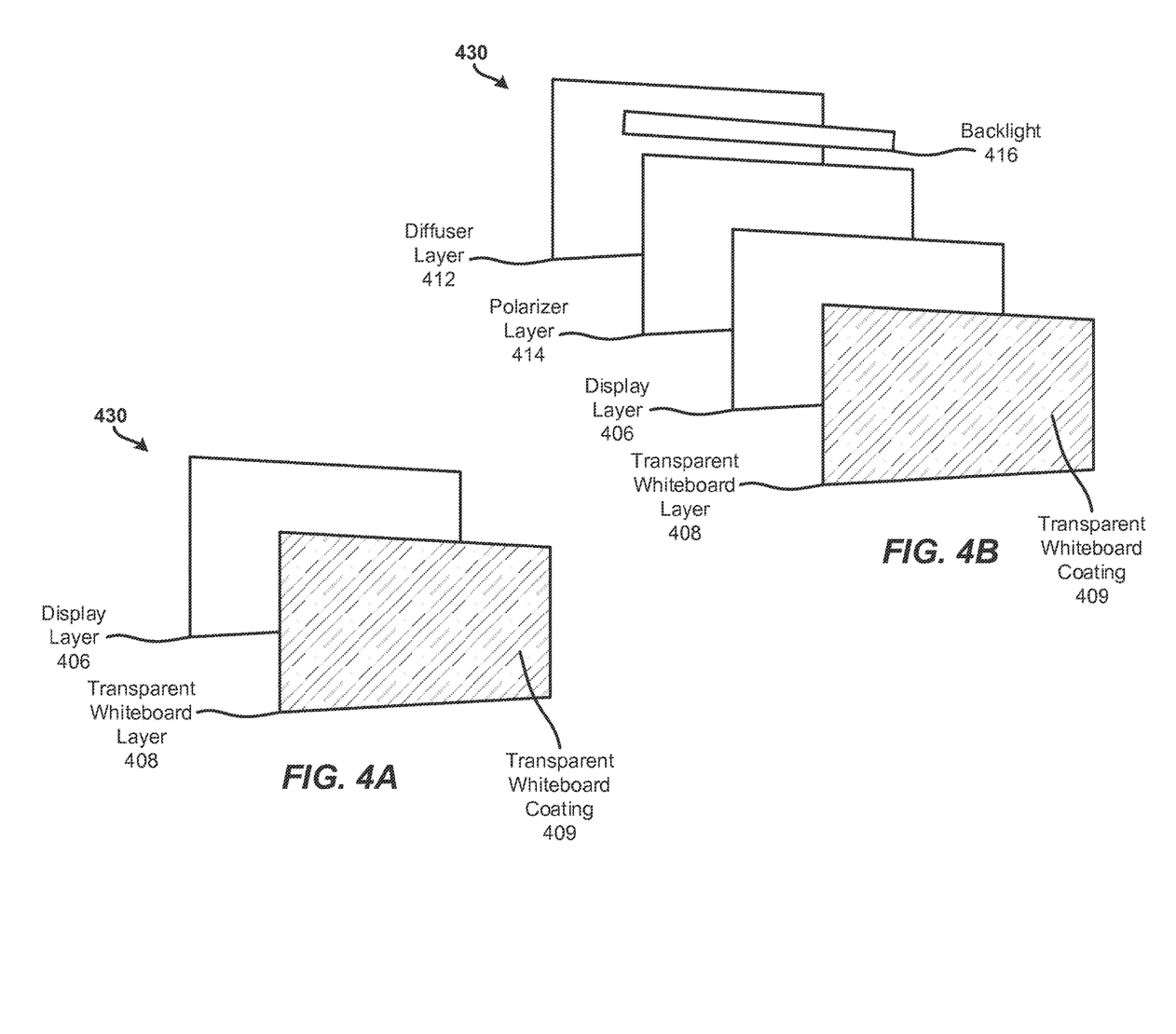
FIGS. 4A and 4B illustrate cutaway diagrams of a transparent whiteboard display according to examples of the present disclosure.

FIGS. 4A and 4B illustrate cutaway diagrams of a transparent whiteboard display 430 according to examples of the present disclosure. The transparent whiteboard display 430 may include several "layers" of components stacked together to form the transparent whiteboard display 430. In various examples, some or all of the components may be combined, removed, replaced, or otherwise modified without deviating from the techniques described herein, The transparent whiteboard display 430 is discussed with references to "front" and "back" portions, especially regarding the display layer 406. It should be understood that the "front" portion is described as the side typically viewed by a viewer, while the "back" portion is opposite the front portion. However, such terminology should not be construed as limiting but rather as merely illustrative.

The display layer 406 causes digital content to be viewable in a first mode and causes analog content to be viewable in a second mode. For example, in the first mode (a display mode), the display layer 406 may receive electronic content such as from a computing system and causes the electronic content to be viewable to a user of the transparent whiteboard display 430. In a second mode (a transparent mode), the display layer 406 may cause analog content input onto a transparent whiteboard layer 408 to be viewable to the user of the transparent whiteboard display 430. In other examples, the display layer 406 may simultaneously cause the digital content and the analog content to be viewable by causing different regions of the display layer 406 to be in the display mode and the transparent mode. In these cases, the transparent whiteboard 430 may function as both a traditional display and as a traditional whiteboard.

It should be understood that, although the analog content may be present and viewable on the transparent whiteboard layer 408 when the display layer 406 is in the display mode, the analog content may be more easily viewable when the display layer is in the transparent mode.

The transparent whiteboard layer 408 is positioned in front of the display layer 406. In particular, the transparent whiteboard layer 408 may be a glass, plastic, or other suitable surface positioned in front of the display 406, the glass, plastic, or other suitable surface having a whiteboard substance applied thereto, such as transparent whiteboard coating 409. The transparent whiteboard coating 409 enables the glass, plastic, or other suitable surface of the transparent whiteboard layer 408 to receive an ink substance such as from a pen, marker, or other writing implement. The transparent whiteboard coating 409 may prevent ink from a writing implement from pooling on the transparent whiteboard layer 408. In other examples, the transparent whiteboard coating 409 may be applied directly to the display layer 406, thereby effectively omitting the transparent whiteboard layer 408. However, in examples, it may be desired to utilize the transparent whiteboard layer 408 to provide protection to the display layer 406.

The transparent whiteboard layer 408 and transparent whiteboard coating 409 are transparent in the sense that, regardless of the material used, the display layer 406 and any content displayed thereon is visible through the transparent whiteboard layer 408 and the transparent whiteboard coating 409. The transparent whiteboard layer 408 and the transparent whiteboard coating 409 are a whiteboard in the sense they it is capable of receiving an ink substance such as from a pen, marker, or other writing implement suitable for use on a whiteboard.

A polarizer layer 414 may be positioned behind the display layer 406 to polarize light as it travels through the display layer 406. The polarizer layer 414 may be utilized in examples in which the display 406 is a liquid crystal display (LCD). In other examples, the display 406 may include a built in polarizer layer 414 (such as built into an LCD). However, the polarizer layer 414 may be omitted from the transparent whiteboard display 430 in examples using other types of displays such as light emitting diode (LED) displays or organic LED displays.

A diffuser layer 412 may be positioned behind the polarizer layer 414 (if present) or directly behind the display layer 406. The diffuser layer 412 provides a light reflecting backing or background to the display layer 406. In this way, light is reflected off the diffuser layer 412, enabling the analog input content on the transparent whiteboard layer 408 to be visible when the display layer 406 is in a transparent mode.

A backlight 416 may be positioned behind the display layer 406 to illuminate the display layer 406, if the display 406 needs to be illumined. For example, if the display 406 is an LCD, a backlight 416 may be utilized to illuminate the display layer 406. However, for other display types, the backlight layer 416 may be omitted from the transparent whiteboard display 430.

Figure 5:
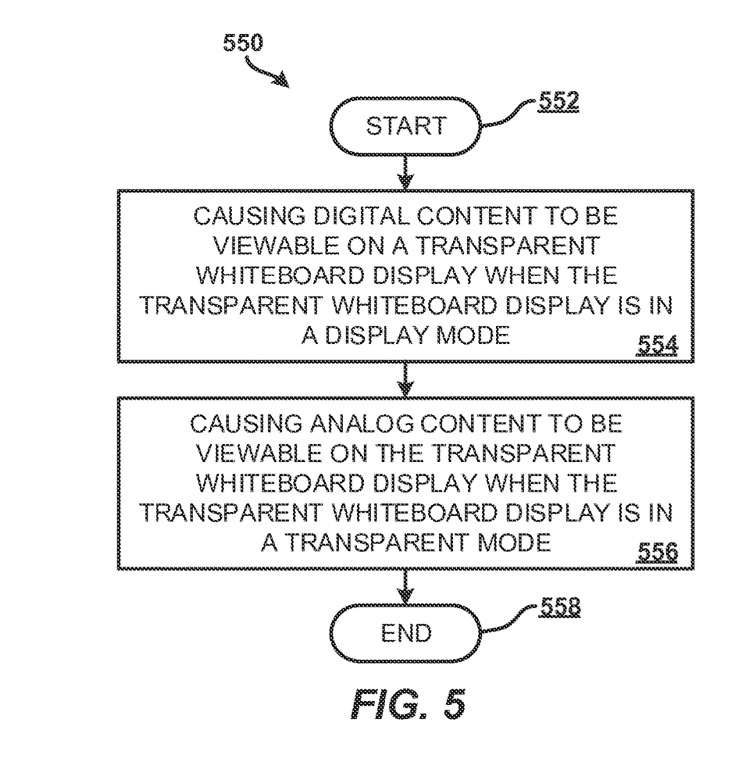
FIG. 5 illustrates a flow diagram of a method relating to a transparent whiteboard display according to examples of the present disclosure.

FIG. 5 illustrates a flow diagram of a method 550 relating to a transparent whiteboard display according to examples of the present disclosure. The method 550 may be executed by a computing system or a computing device such as computing systems 100, 200, and/or 300 of FIGS. 1-3 respectively or may be stored as instructions on a non-transitory computer-readable storage medium that, when executed by a processor, cause the processor to perform the method 550. In one example, method 550 may include: causing, by a computing system, digital content to be viewable on a transparent whiteboard display when the transparent whiteboard display is in a display mode (block 554); and causing, by the computing system, analog content to be viewable on the transparent whiteboard display when the transparent whiteboard display in a transparent mode (block 556).

The method 550 may begin at block 502 and then continue to block 554. At block 554, the method 550 includes a computing system (e.g., computing systems 100, 200, and/or 300 of FIGS. 1-3 respectively) causes digital content to be viewable on a transparent whiteboard display (e.g., transparent whiteboard displays 130 and 430 of FIGS. 1 and 4 respectively) when the transparent whiteboard display is in a display mode. The display mode means that the display (e.g. display 106, 206, 306, and/or 406 of FIGS. 1-4 respectively) of the transparent whiteboard display is not transparent (or at least not fully transparent) such that digital content is displayed on the transparent whiteboard. The method then continues to block 556.

At block 556, the method 500 includes the computing system (e.g., computing systems 100, 200, and/or 300 of FIGS. 1-3 respectively) causes analog content to be viewable on the transparent whiteboard display (e.g., transparent whiteboard displays 130 and 430 of FIGS. 1 and 4 respectively) when the transparent whiteboard display is in a transparent mode. The transparent mode means that the display (e.g. display 106, 206, 306, and/or 406 of FIGS. 1-4 respectively) is partially and/or fully transparent such that analog content (i.e., ink from a dry erase marker or other suitable writing implement) on the transparent whiteboard is more easily viewable. The method 500 ends at block 558.

Additional processes also may be included, and it should be understood that the processes depicted in FIG. 5 represent illustrations, and that other processes may be added or existing processes may be removed, modified, or rearranged without departing from the scope and spirit of the present disclosure.

It should be emphasized that the above-described examples are merely possible examples of implementations and set forth for a clear understanding of the present disclosure. Many variations and modifications may be made to the above-described examples without departing substantially from the spirit and principles of the present disclosure. Further, the scope of the present disclosure is intended to cover any and all appropriate combinations and sub-combinations of all elements, features, and aspects discussed above. All such appropriate modifications and variations are intended to be included within the scope of the present disclosure, and all possible claims to individual aspects or combinations of elements or steps are intended to be supported by the present disclosure.

What is claimed is:

1. A transparent whiteboard display, comprising:
a display layer to cause digital content to be viewable in a first mode and to cause analog content to be viewable in a second mode, the white board display further comprising a diffuser layer to reflect light through the display layer when the display layer is in the second mode to display the analog content; and
a transparent whiteboard layer having a transparent whiteboard coating to receive the analog content on a surface of the transparent whiteboard layer from an input device, wherein the digital content is displayed in a display region and the analog content is displayed in a whiteboard region such that the display region and the whiteboard region are displayed concurrently on the transparent whiteboard display, wherein the display region and the whiteboard region move around the transparent whiteboard display based on a position of an input of the analog content on the transparent whiteboard display.

2. The transparent whiteboard display of claim 1, further comprising:
a positioning system to calculate a position of the input device relative to the transparent whiteboard layer using position data generated by a sensor of the positioning system.

3. The transparent whiteboard display of claim 2, wherein the sensor of the positioning system includes a first camera.

4. The transparent whiteboard display of claim 3, wherein the positioning system uses position data generated by a second sensor of the positioning system.

5. The transparent whiteboard display of claim 4, wherein the second sensor of the positioning system includes a second camera.

6. The transparent whiteboard display of claim 1, wherein the display layer is a light-emitting diode (LED) layer.

7. The transparent whiteboard display of claim 1, further comprising:
a backlight to illuminate the display layer.

8. The transparent whiteboard display of claim 1, further comprising:
a polarizer layer to polarize light as it travels through the display layer.

9. A computing system comprising:
a processor;
a display control module executable by the processor to control a transparency mode of a display by displaying a digital content viewable in a first mode via a display layer; and
an analog content viewable in a second mode, wherein the analog content is received on a surface of a transparent whiteboard layer of a transparent whiteboard display, the white board display further comprising a diffuser layer to reflect light through the display layer when the display layer is in a second mode to display the analog content, wherein the digital content is displayed in a display region and the analog content is displayed in a whiteboard region such that the display region and the whiteboard region are displayed concurrently on the transparent whiteboard display, wherein the display region and the whiteboard region move around the transparent whiteboard display based on a position of an input of the analog content on the transparent whiteboard display; and
an input positioning module executable by the processor to calculate the position of the input on the transparent whiteboard layer of the display using positioning data generated by a positioning system.

10. The computing system of claim 9, wherein the positioning system further comprises a first camera and a second camera to generate the positioning data.

11. The computing system of claim 9, further comprising:
an input/output interface;
a network interface; and
an image processing interface.

12. The computing system of claim 9, wherein the display control module and the input positioning module are stored in a computer-readable storage medium.

13. The computing system of claim 9, wherein the input is an analog input generated by a writing implement.

14. A method comprising:

causing, by a computing system, digital content to be viewable on a transparent whiteboard display when the transparent whiteboard display is in a display mode; and causing, by the computing system, analog content to be viewable on the transparent whiteboard display when the transparent whiteboard display in a transparent mode, wherein the transparent whiteboard display comprises a diffuser layer to reflect light through the transparent whiteboard display layer when the transparent whiteboard display layer is in a second mode to display the analog content, wherein the digital content is displayed in a display region and the analog content is displayed in a whiteboard region such that the display region and the whiteboard region are displayed concurrently on the transparent whiteboard display, and wherein the display region and the whiteboard region move around the transparent whiteboard display based on a position of an input of the analog content on the transparent whiteboard display.

\* \* \* \* \*

UNITED STATES PATENT AND TRADEMARK OFFICE
CERTIFICATE OF CORRECTION

PATENT NO. : 10,431,145 B2
APPLICATION NO. : 15/326272
DATED : October 1, 2019
INVENTOR(S) : Eric Michael Lunsford et al.

Page 1 of 1

It is certified that error appears in the above-identified patent and that said Letters Patent is hereby corrected as shown below:

On the Title Page

In Column 2, item (57), Abstract, Line 8, after "display" insert -- is --.

Signed and Sealed this
Seventh Day of April, 2020

Andrei Iancu
*Director of the United States Patent and Trademark Office*